US011897105B2

(12) United States Patent
Huang

(10) Patent No.: US 11,897,105 B2
(45) Date of Patent: Feb. 13, 2024

(54) STAMPING PLIERS FOR STAMPING AND BONDING

(71) Applicant: Chin-Chen Huang, Taichung (TW)

(72) Inventor: Chin-Chen Huang, Taichung (TW)

( * ) Notice: Subject to any disclaimer, the term of this patent is extended or adjusted under 35 U.S.C. 154(b) by 500 days.

(21) Appl. No.: 17/157,933

(22) Filed: Jan. 25, 2021

(65) Prior Publication Data

US 2022/0234181 A1 Jul. 28, 2022

(51) Int. Cl.

*B25C 1/02* (2006.01)
*B25C 9/00* (2006.01)
*B25B 7/08* (2006.01)

(52) U.S. Cl.

CPC .................. *B25C 1/02* (2013.01); *B25B 7/08* (2013.01); *B25C 9/00* (2013.01)

(58) Field of Classification Search

CPC ..... B26F 1/36; B25B 7/00; B25B 7/02; B25B 7/14; B25B 7/08; B25F 1/003; B25F 1/04; B25C 1/02; B25C 9/00

USPC .......................................................... 227/147

See application file for complete search history.

(56) References Cited

U.S. PATENT DOCUMENTS 934,635 A * 9/1909 Thurgar .................... B26F 1/36 30/363
6,817,074 B2 * 11/2004 Lalonde ................. B21J 15/025 29/798

* cited by examiner

*Primary Examiner* — Jacob A Smith

(57) ABSTRACT

A pair of stamping pliers for stamping and bonding includes a first handle, a second handle and a stamping nail. The first handle and the second handle are staggered, pivotally connected, and rotated with respect to each other, and the first handle has a stamping seat which is a stamping groove and a guide through hole provided for moving the stamping nail axially. The second handle has a linking portion linkable to the stamping nail, so that when the second handle is rotated relative to the first handle, the linking portion can be linked to the stamping nail to move the stamping nail axially in the guide through hole.

4 Claims, 8 Drawing Sheets

STAMPING PLIERS FOR STAMPING AND BONDING

BACKGROUND OF THE INVENTION

Technical Field

The present invention generally relates to stamping pliers for stamping and bonding, and more particularly relates to the stamping pliers capable of driving a stamping nail to penetrate through two boards and force the penetration positions of the boards to be compressed and deformed, so as to achieve the effects of combining and fixing the two boards.

Description of the Related Art

At present, most interior decorations use light partitions to separate spaces. In addition to the effect of reducing the overall structural weight effectively, the partition of the light steel frame can omit many construction processes compared with the traditional wet construction, and the light steel frame can be used and matched with different boards to meet different user requirements. For example, the light steel frame is combined with a metal board to serve as a wall.

Since the metal board generally comes with a relative small thickness, it is difficult to combine the metal board with the light steel frame by welding (because the board may be damaged by hot melting easily). Therefore, it is a common way to fix the light steel frame and the board by screws or rivets. Although this way can achieve a stable combination, it is generally necessary to use a certain quantity of screws or rivets for the fixation, and thus resulting in a time-consuming assembling process.

In view of the aforementioned drawbacks of the prior art, the inventor of the present invention based on years of experience in the related industry to conduct extensive research and experiment, and finally developed a pair of innovative stamping pliers for stamping and bonding to overcome the drawbacks of the prior art.

SUMMARY OF THE INVENTION

Therefore, it is a primary objective of the present invention to overcome the aforementioned drawbacks of the prior art by providing a pair of stamping pliers for stamping and bonding capable of driving a stamping nail to penetrate through two boards to force the penetration positions of the two boards to be compressed and deformed, so as to achieve the effect of combining and fixing the two boards.

To achieve the aforementioned and other objectives, the present invention discloses a stamping pliers for stamping and bonding, comprising: a first handle, having a first pivot portion, a first grip portion extending outwardly from an end of the first pivot portion, and a stamping seat extending from an end of the first pivot portion in a direction away from the first grip portion; the stamping seat having a stamping groove and a guide through hole, and the guide through hole penetrating through the stamping seat and passing through the stamping groove; a second handle, having a second pivot portion, a second grip portion extending outwardly from an end of the second pivot portion, and a linking portion extending from an end of the second pivot portion in a direction away from the second grip portion, and the linking portion having an engaging recess; the second pivot portion being pivoted to the first pivot portion, so that the second handle can be rotated relative to the first handle; and a stamping nail, axially and movably installed into the guide through hole, and having a nail head and a nail tip disposed at both ends of the stamping nail respectively, and the nail head being engaged with the engaging recess, and the nail tip being substantially in a form of a triangular plate; so that when the second handle is rotated relative to the first handle, the linking portion can be linked to the stamping nail to move the stamping nail axially in the guide through hole.

To achieve the aforementioned and other objectives, the stamping seat of the present invention further has a first stop block and a second stop block, and the stamping groove is concavely formed between the first stop block and the second stop block, and the guide through hole has a first through hole and a second through hole; the first through hole is penetrated through the first stop block and communicated with the stamping groove, and the second through hole is penetrated through the second stop block and communicated with the stamping groove, and the diameter of the second through hole is greater than the diameter of the first through hole, and the central axis of the first through hole and the central axis of the second through hole are on the same axis.

To achieve the aforementioned and other objectives, the linking portion of the present invention further has a first limit portion and a second limit portion disposed at both ends of the second pivot portion and adjacent to the second grip portion and the engaging recess respectively, and the first limit portion and the second limit portion are provided for limiting a rotation range of the second handle.

To achieve the aforementioned and other objectives, the first limit portion of the present invention is a rivet fixed to the linking portion, and the second limit portion is a roller pivoted to the linking portion.

To achieve the aforementioned and other objectives, the stamping nail of the present invention has two opposite bevels disposed at joint positions of the stamping nail and the nail tip coupled to both sides of the nail tip respectively.

The above and other objects and technical characteristics of the present invention will become apparent from the following detailed description taken with the accompanying drawings.

DESCRIPTION OF THE PREFERRED EMBODIMENTS

Figure 1:
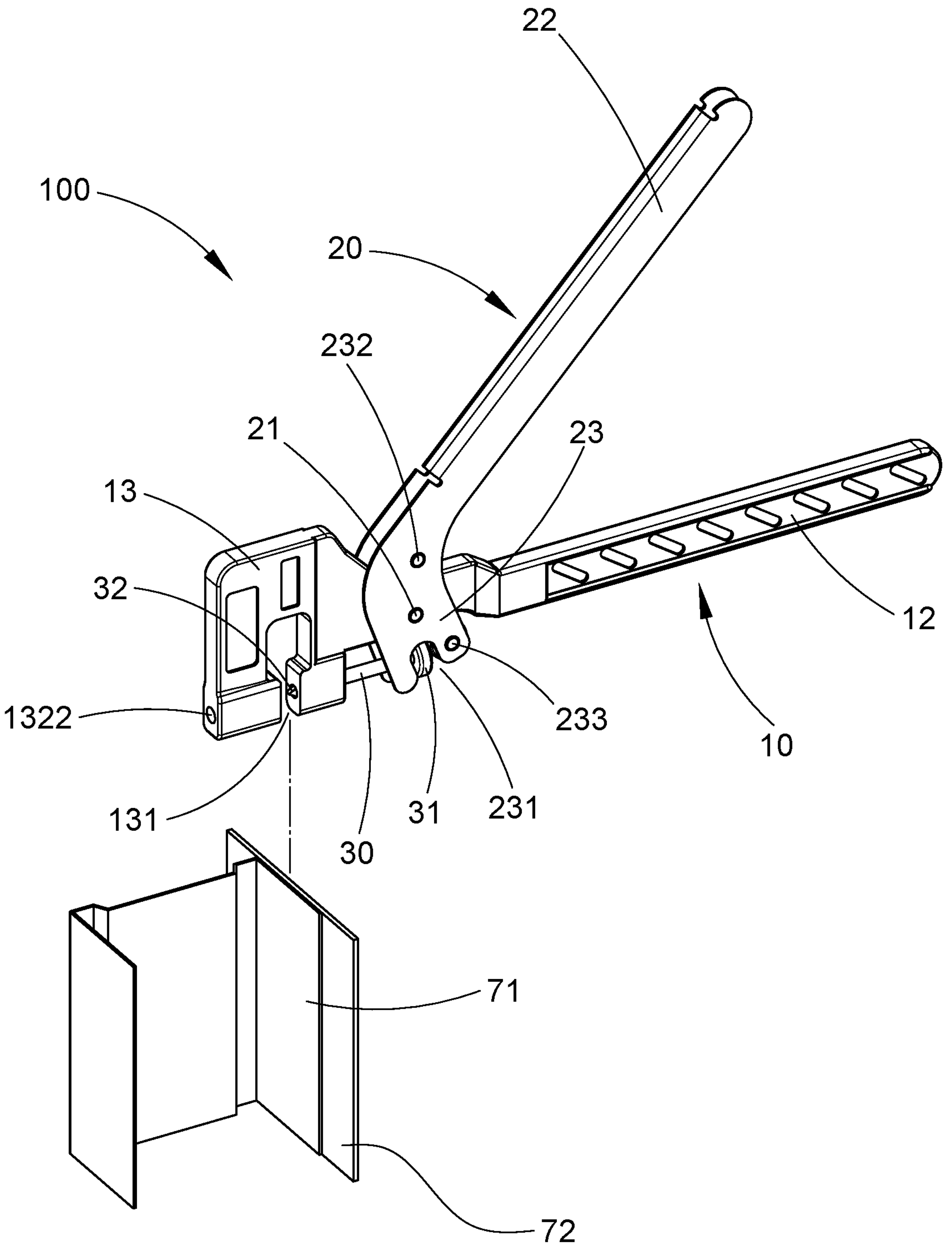
FIG. 1 is a perspective view of a pair of stamping pliers for stamping and bonding in accordance with the present invention.
Figure 2:
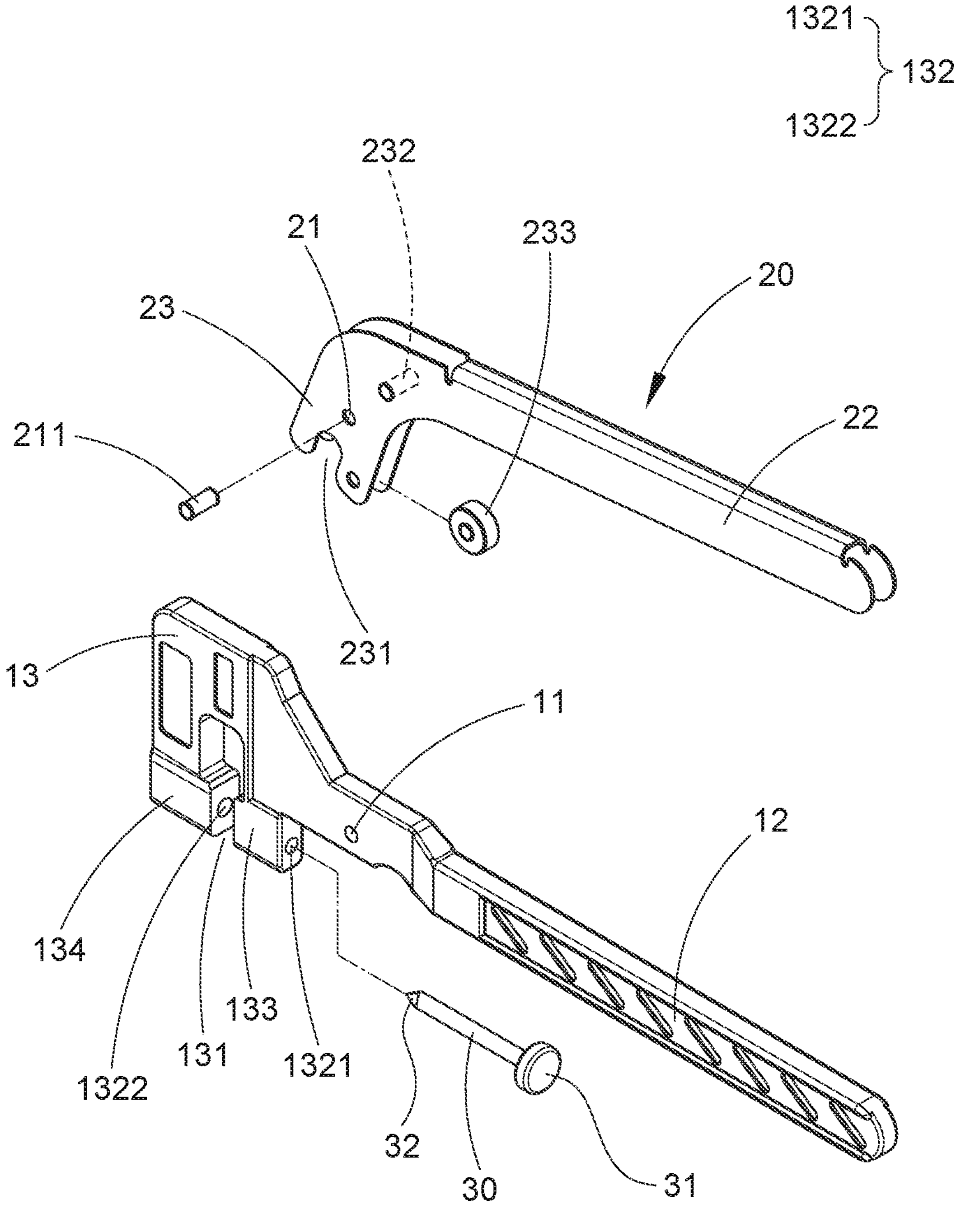
FIG. 2 is an exploded view of a pair of stamping pliers for stamping and bonding in accordance with the present invention.
Figure 3:
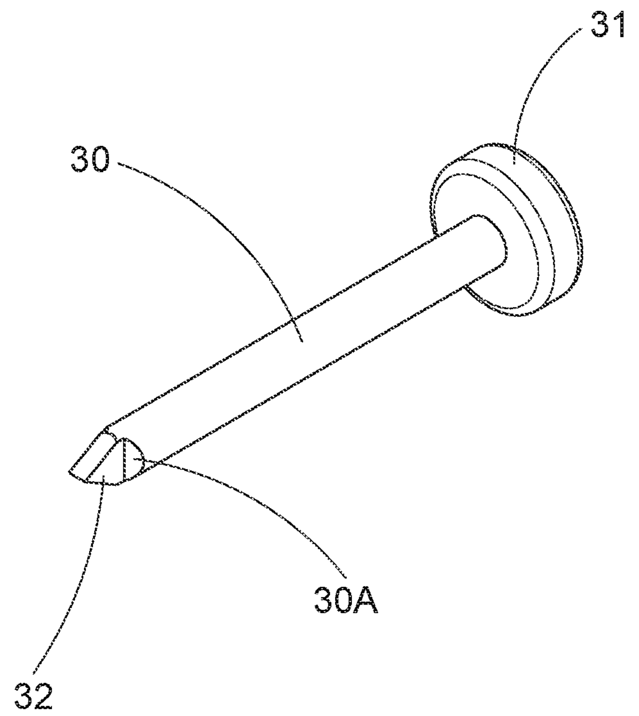
FIG. 3 is a schematic view of a stamping nail of the present invention.

With reference to FIGS. 1 to 5 for a pair of stamping pliers for stamping and bonding 100 in accordance with a preferred embodiment of the present invention, the stamping pliers are used for fixing a light steel frame of a construction (such as fixing a light steel frame 71 with a board 72, or fixing two boards) and comprises: a first handle 10, a second handle 20 and a stamping nail 30.

The first handle 10 has a first pivot portion 11, a first grip portion 12 extending outwardly from an end of the first pivot portion 11, and a stamping seat 13 extending from an end of the first pivot portion 11 in a direction away from the first grip portion 12; and the stamping seat 13 has a stamping groove 131 and a guide through hole 132, and the guide through hole 132 is penetrated through the stamping seat 13 and passed through the stamping groove 131.

The second handle 20 has a second pivot portion 21, a second grip portion 22 extending outwardly from an end of the second pivot portion 21, and a linking portion 23 extending from an end of the second pivot portion 21 in a direction away from the second grip portion 22, and having an engaging recess 231; the second pivot portion 21 of the second handle 20 is staggered with and pivoted to the first pivot portion 11 of the first handle 10, so that the second handle 20 can be rotated relative to the first handle 10, and the second grip portion 22 can be moved close to or away from the first grip portion 12 by the rotation of the second handle 20. Wherein, a predetermined included angle Q is formed between the second grip portion 22 and the linking portion 23, and the second pivot portion 21 is pivoted to the first pivot portion 11 by a shaft 211 (such as a rivet).

The stamping nail 30 is in a round rod shape and can be axially and movably disposed into the guide through hole 132; a nail head 31 and a nail tip 32 are disposed at both ends of the stamping nail 30 respectively, and the nail head 31 is engaged with the engaging recess 231, and the nail tip 32 is a triangular plate. Wherein, the stamping nail 30 has two opposite bevels 30A disposed at joint positions of the stamping nail 30 and the nail tip 32 and coupled to both sides of the nail tip 32 respectively.

When the second handle 20 is rotated relative to the first handle 10, the linking portion 23 can be linked to the stamping nail 30 to axially move the stamping nail 30 in the guide through hole 132.

In this embodiment, a first stop block 133 and a second stop block 134 are extended downwardly from the stamping seat 13, and the stamping groove 131 is concavely formed under the stamping seat 13 and disposed between the first stop block 133 and the second stop block 134; and the guide through hole 132 has a first through hole 1321 and a second through hole 1322, and the first through hole 1321 is penetrated through the first stop block 133 and communicated with the stamping groove 131, and the second through hole 1322 is penetrated through the second stop block 134 and communicated with the stamping groove 131, and the diameter of the second through hole 1322 is slightly greater than the diameter of the first through hole 1321, and the central axis of the first through hole 1321 and the central axis of the second through hole 1322 are on the same axis.

The linking portion 23 further has a first limit portion 232 and a second limit portion 233 disposed at both ends of the second pivot portion 21 and adjacent to the second grip portion 22 and the engaging recess 231 respectively; and the first limit portion 232 and the second limit portion 233 are provided for limiting the rotation range of the second handle 20 relative to the first handle 10; wherein, the first limit portion 232 is a rivet fixed onto the linking portion 23, and the second limit portion 233 is a roller pivoted to the linking portion 23. In addition to the function of limiting the second handle 20, this arrangement also assists pushing the nail head 31.

During operation, the second handle 20 can be rotated relative to the first handle 10 and at least has a before-push position P1 and an after-push position P2.

Figure 4:
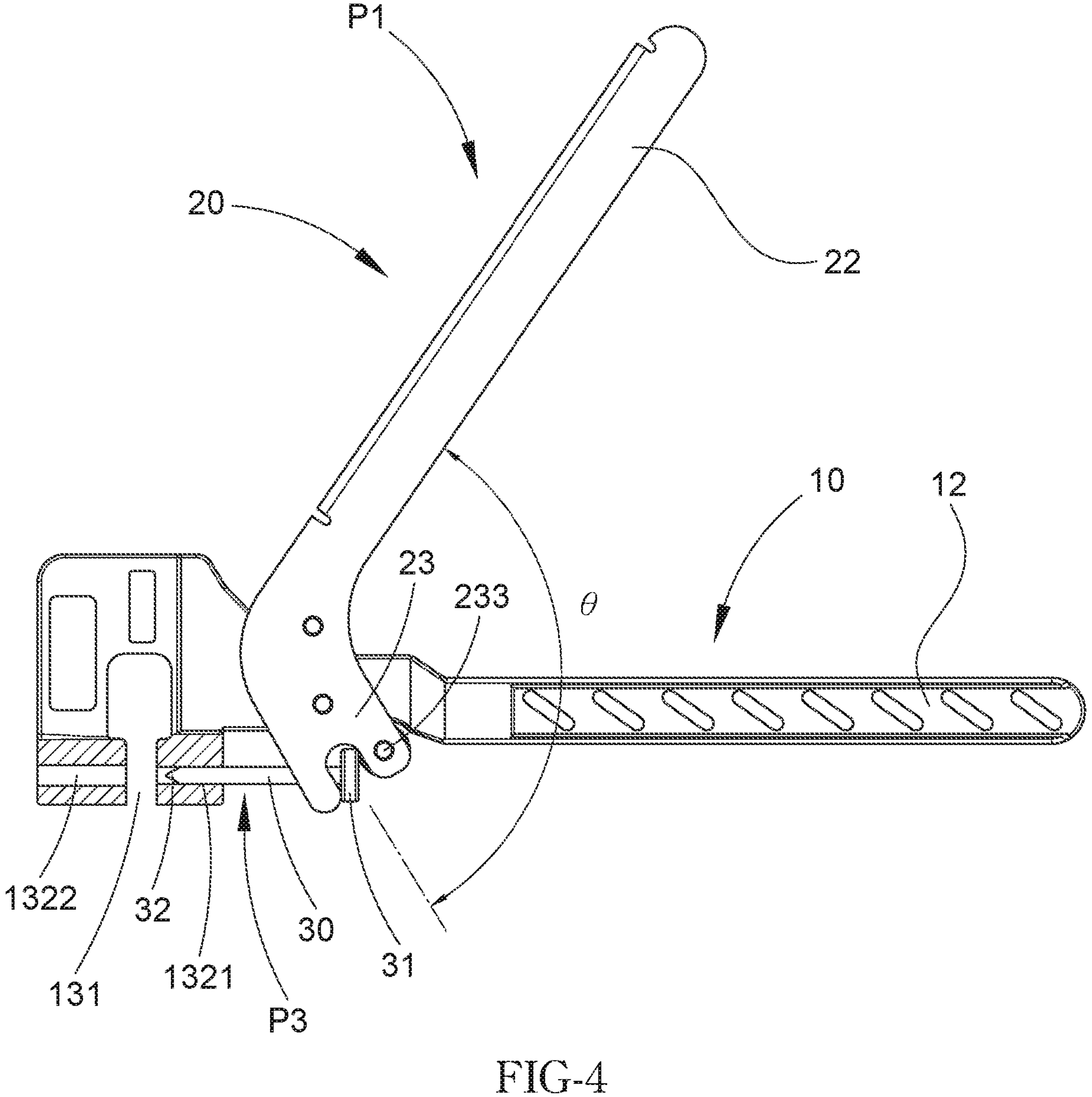
FIG. 4 is a schematic view of a pair of stamping pliers at an unstamped status in accordance with the present invention.

In FIG. 4, when the second handle 20 is situated at the before-push position P1, the second grip portion 22 is disposed relatively away from the first grip portion 12, and the second limit portion 233 abuts against the bottom of the first handle 10 to limit the distance of the second handle 20 from the first handle 10, and the nail head 31 of the stamping nail 30 is linked by the linking portion 23 to situate at an unstamped position P3. Now, the nail tip 32 of the stamping nail 30 is situated in the first through hole 1321 (In other words, the stamping nail 30 has not been passed through the stamping groove 131 and the second through hole 1322).

Figure 5:
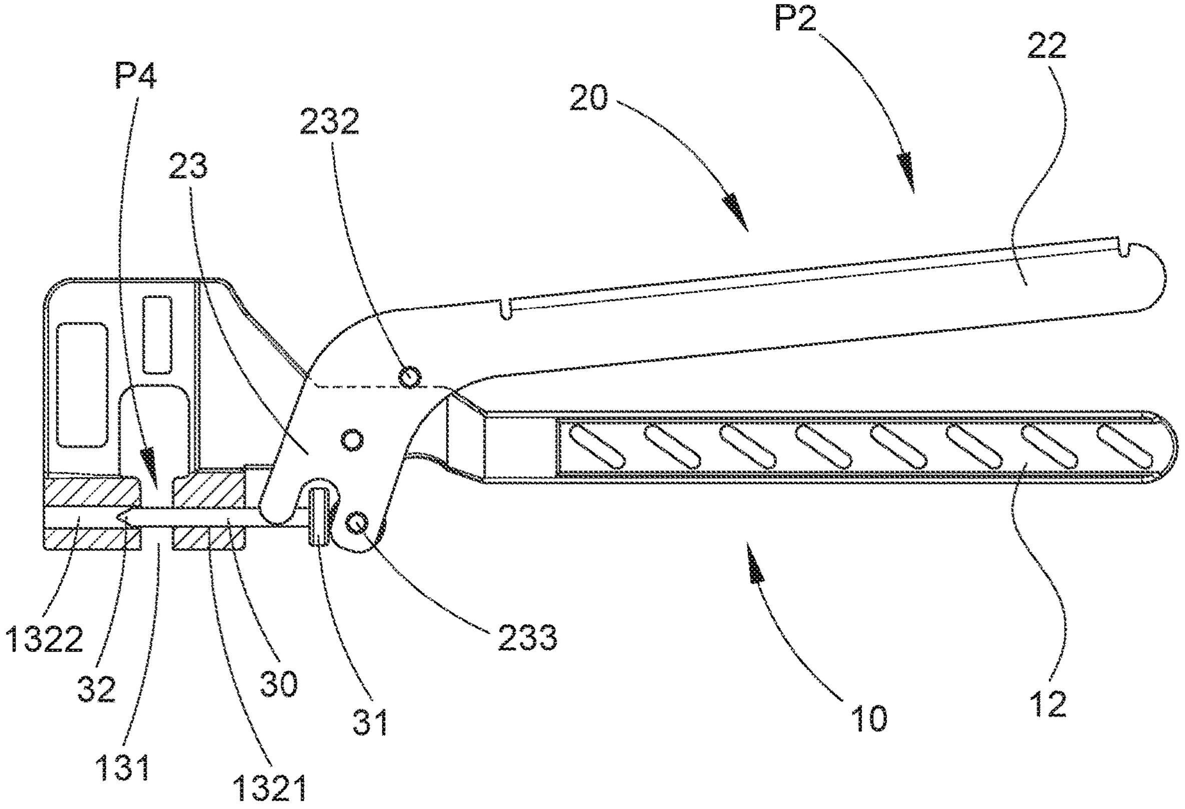
FIG. 5 is a schematic view of a pair of stamping pliers at a stamped status in accordance with the present invention.

In FIG. 5, when the second handle 20 is situated at the after-push position P2, the second grip portion 22 is relatively close to the first grip portion 12, and the first limit portion 232 abuts against the top of the first handle 10 to limit the distance of the second handle 20 close to the first handle 10, and the nail head 31 of the stamping nail 30 is pushed by the linking portion 23 to situate at a stamped position P4. Now, the stamping nail 30 is passed through the first through hole 1321, the stamping groove 131 and the second through hole 1322, and the nail tip 32 is situated in the second through hole 1322. It is noteworthy that the second limit portion 233 also achieves a smooth linkage effect when the second handle 20 at the before-push position P1 is moved to the after-push position P2, and the roller shape of the second limit portion 233 can also assist pushing the nail head 31 of the stamping nail 30, in addition to limiting the rotation of the second handle 20.

When use, users just need to rotate the second handle 20 to the before-push position P1 and align the stamping groove 131 with the light steel frame 71 and the board 72 to be fixed, and then press and turn the second handle 20 from the before-push position P1 to the after-push position P2 to move the stamping nail 30 from the unstamped position P3 to the stamped position P4 and penetrate through the light steel frame 71 and the board 72, so as to compress and deform the penetrating position and achieve the combining effect.

Figure 6:
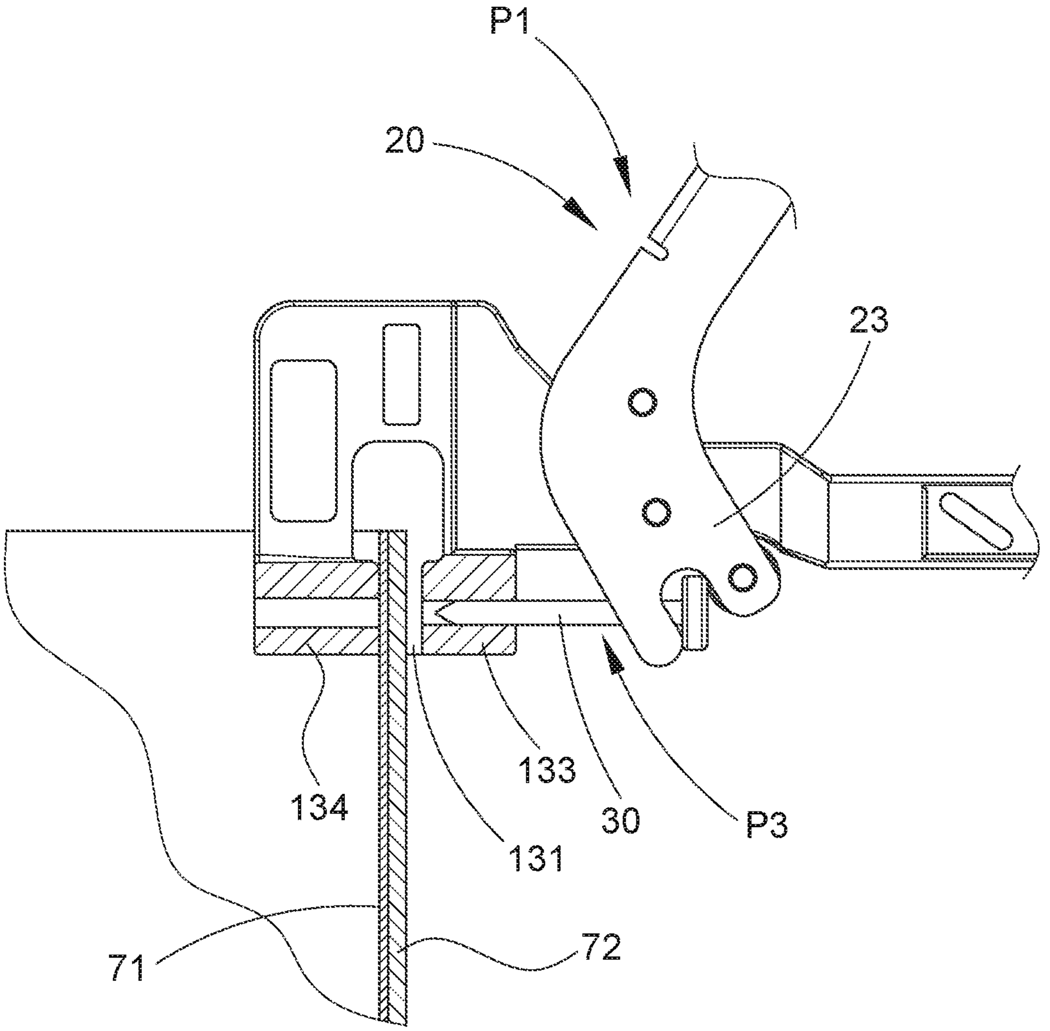
FIG. 6 is a schematic view of a board and a light steel frame of the present invention before being stamped.

In FIG. 6, when use, the users need to rotate the second handle 20 to the before-push position P1, and align the stamping groove 131 with the required fixing positon of the mutually attached light steel frame 71 and board 72. Now, the first stop block 133 and the second stop block 134 are configured to be corresponsive to the inner surface of the board 72 and the light steel frame 71, and the stamping nail 30 is situated at the unstamped position P3.

Figure 7:
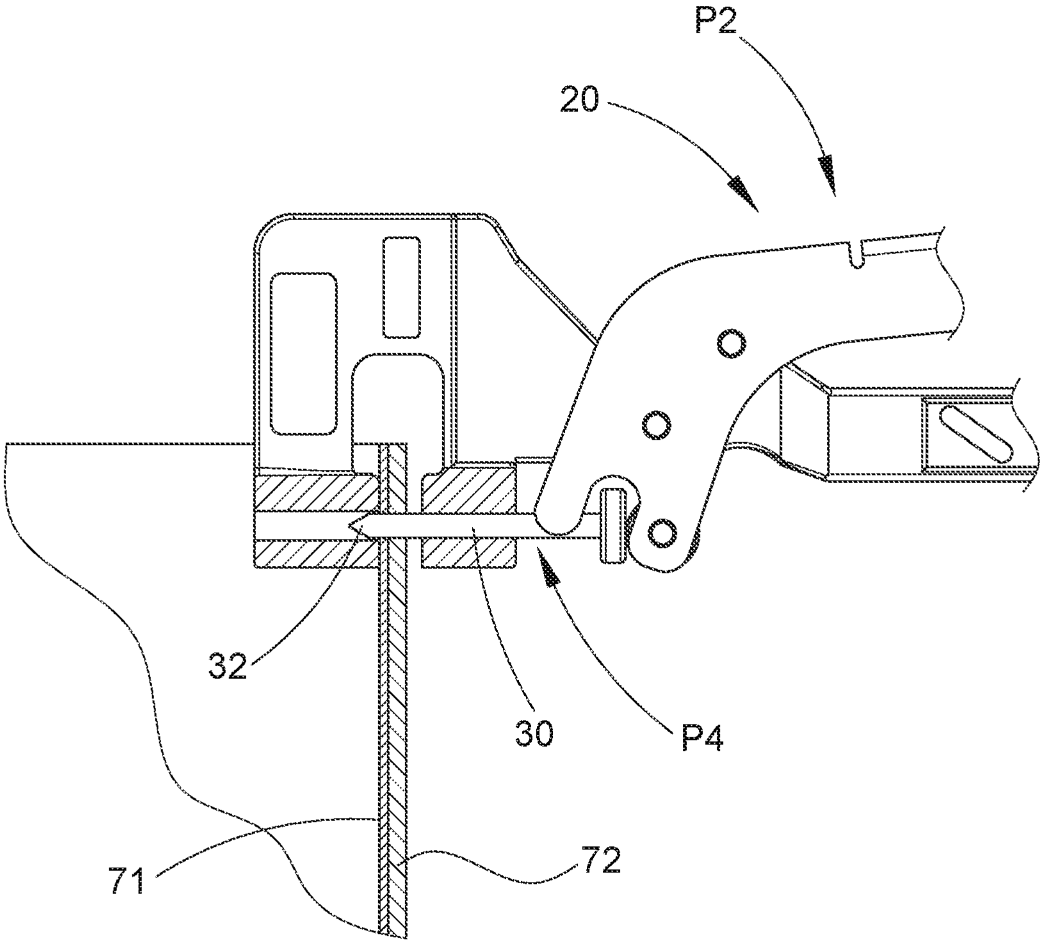
FIG. 7 is a schematic view of a board and a light steel frame after being stamped in accordance with the present invention.
Figure 8:
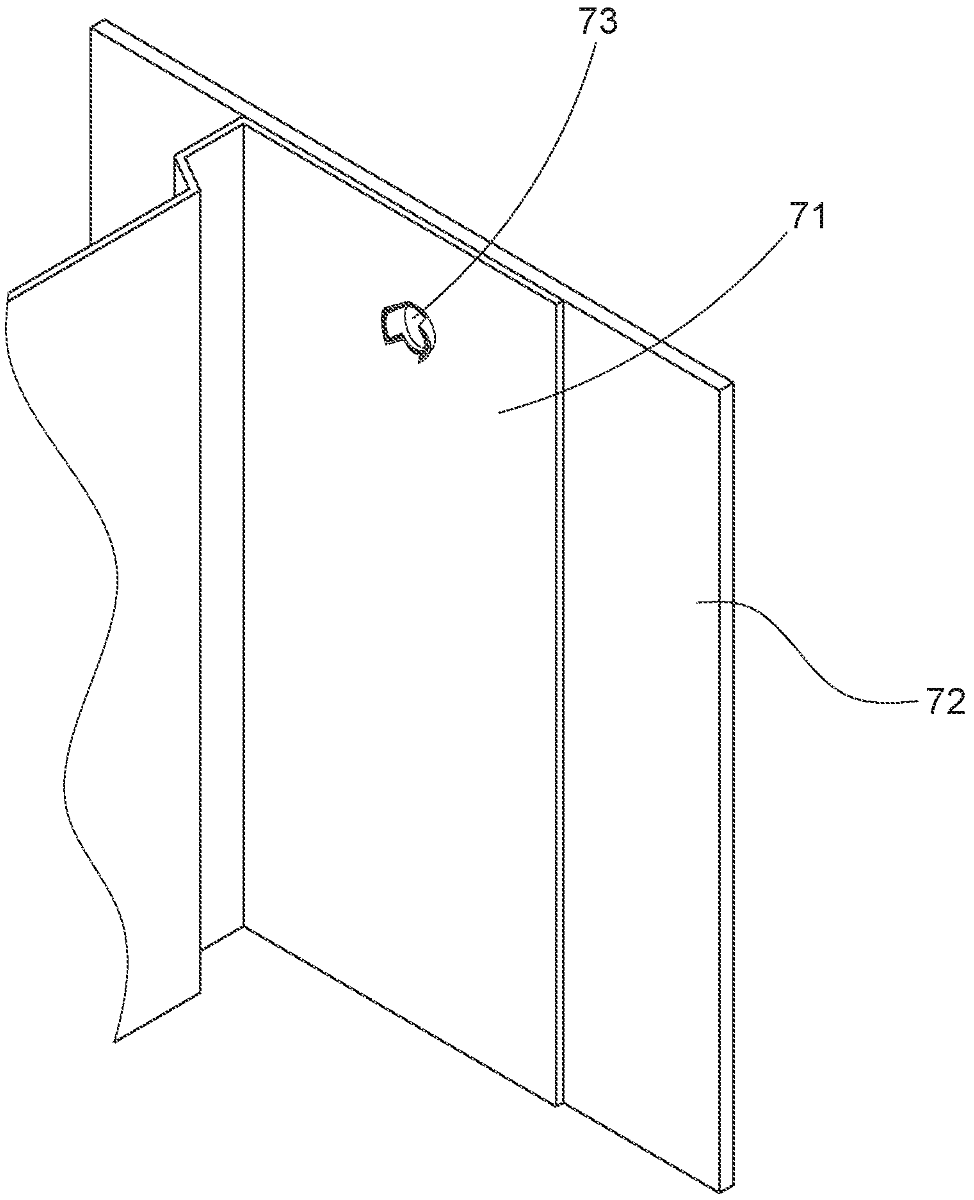
FIG. 8 is a schematic view of combining and fixing a board and a light steel frame by stamping in accordance with the present invention.

In FIG. 7, the second handle 20 is pressed to rotate from the before-push position P1 to the after-push position P2 in order to move the stamping nail 30 from the unstamped position P3 to the stamped position P4 so as to penetrate through the board 72 and the light steel frame 71 and force the penetrated position to be deformed by the triangular plate design of the nail tip and the round rod shape of the stamping nail 30 to achieve the effect of combining the board 72 and the light steel frame 71 (as shown in FIG. 8, wherein the board 72 and the light steel frame 71 produce irregular penetrating holes 73 after being penetrated by the stamping nail 30, and the peripheries of the irregular penetrating holes 73 are compressed, deformed, and expanded outwardly to fix and combine the board 72 and the light steel frame 71 with each other.

After the board 72 and the light steel frame 71 are combined and fixed, the second handle 20 is rotated back to the before-push position P1 to link the stamping nail 30 to restore the unstamped position P3 (that is to recover the status as shown in FIG. 6 from the status as shown in FIG. 7), so as to move away the stamping pliers for stamping and bonding 100 in accordance with the present invention.

It is noteworthy that the stamping pliers of an embodiment of the present invention are applied for fixing the light steel frame and the board. In practical application. In a practical application, the present invention can also be used for fixing and combining various boards such as a combination of a metal board and a fireproof board or a combination of two metal boards.

In summation, the present invention has the following advantages and effects:

1. Quick Combination: At present, the light steel frame and the board are commonly fixed by screws or rivets. Although this method can achieve a stable combination, it is generally necessary to use a certain quantity of screws or rivets for the fixation, and thus the assembling process is time consuming. On the other hand, the present invention just needs to press the second handle 20 to rotate the second handle 20 from the before-push position P1 to the after-push position P2 to penetrate the stamping nail 30 through the board 72 and the light steel frame 71 and force the penetrated position to be compressed and defined, so as to achieve the effect of combining the board 72 and the light steel frame 71.

2. Good Fixing Effect: The present invention uses the design of the triangular plate of the nail tip 32 and the design of the round rod shape of the stamping nail 30 to penetrate the stamping nail 30 through the board 72 and the light steel frame 71, so as to compress and deform the penetrated position in two stages, and achieve the effect of combining the board 72 and the light steel frame 71.

In summation of the description above, persons having ordinary skill in the art understand that the present invention surely achieves the aforementioned objectives and complies with patent application requirements, and thus is duly filed for patent application. While the invention is described in some detail hereinbelow with reference to certain illustrated embodiments, it is to be understood that there is no intent to limit the invention to those embodiments. On the contrary, the aim is to cover all modifications, alternatives and equivalents falling within the spirit and scope of the invention as defined by the appended claims.

What is claimed is:

1. A pair of stamping pliers for stamping and bonding, comprising:

a first handle, having a first pivot portion, a first grip portion extending outwardly from an end of the first pivot portion, and a stamping seat extending from an end of the first pivot portion in a direction away from the first grip portion;

the stamping seat having a stamping groove and a guide through hole, and the guide through hole penetrating through the stamping seat and passing through the stamping groove;

a second handle, having a second pivot portion, a second grip portion extending outwardly from an end of the second pivot portion, and a linking portion extending from an end of the second pivot portion in a direction away from the second grip portion, and the linking portion having an engaging recess;

the second pivot portion being pivoted to the first pivot portion, so that the second handle can be rotated relative to the first handle; and a stamping nail, axially and movably installed into the guide through hole, and having a nail head and a nail tip disposed at opposite ends of the stamping nail respectively, and the nail head being engaged with the engaging recess, and the nail tip being substantially in a form of a triangular plate;

wherein:

when the second handle is rotated relative to the first handle, the linking portion be linked to engages the stamping nail to move the stamping nail axially in the guide through hole; and the linking portion further has a first limit portion and a second limit portion disposed at ends of the second pivot portion and adjacent to the second grip portion and the engaging recess respectively, and the first limit portion and the second limit portion are provided for limiting a rotation range of the second handle.

2. The stamping pliers for stamping and bonding as claimed in claim 1, wherein the stamping seat further has a first stop block and a second stop block, and the stamping groove is defined between the first stop block and the second stop block, and the guide through hole has a first through hole and a second through hole; the first through hole is penetrated through the first stop block and communicated with the stamping groove, and the second through hole is penetrated through the second stop block and communicated with the stamping groove, and a diameter of the second through hole is greater than a diameter of the first through hole, and a central axis of the first through hole and a central axis of the second through hole are on a same axis.

3. The stamping pliers for stamping and bonding as claimed in claim 1, wherein the first limit portion is a rivet fixed onto the linking portion, and the second limit portion is a roller pivoted to the linking portion.

4. The stamping pliers for stamping and bonding as claimed in claim 1, wherein the stamping nail has two opposite bevels disposed at joint positions of the stamping nail and the nail tip coupled to both sides of the nail tip respectively.

* * * * *